US010785473B2

(12) United States Patent
Larson et al.

(10) Patent No.: US 10,785,473 B2
(45) Date of Patent: Sep. 22, 2020

(54) VIRTUAL WINDOW DISPLAY

(71) Applicant: HONEYWELL INTERNATIONAL INC., Morris Plains, NJ (US)

(72) Inventors: Brent D. Larson, Phoenix, AZ (US); Ken Leiphon, Phoenix, AZ (US); Kalluri R. Sarma, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/244,360

(22) Filed: Jan. 10, 2019

(65) Prior Publication Data
US 2020/0228789 A1 Jul. 16, 2020

(51) Int. Cl.
H04N 13/351 (2018.01)
H04N 13/312 (2018.01)
G02B 27/01 (2006.01)

(52) U.S. Cl.
CPC ....... H04N 13/351 (2018.05); G02B 27/0101 (2013.01); H04N 13/312 (2018.05); G02B 2027/013 (2013.01); G02B 2027/0123 (2013.01); G02B 2027/0134 (2013.01); G02B 2027/0138 (2013.01)

(58) Field of Classification Search
None
See application file for complete search history.

(56) References Cited

U.S. PATENT DOCUMENTS 5,825,540 A 10/1998 Gold et al.
6,744,557 B1 6/2004 Chen
9,251,743 B2 2/2016 Nestorovic
9,864,193 B2 1/2018 Getin et al.
2006/0256302 A1 11/2006 Hsu
2008/0204663 A1* 8/2008 Balogh ............... H04N 13/363
353/10
2012/0127320 A1 5/2012 Balogh
2012/0327199 A1 12/2012 Chen et al.
2017/0038590 A1 2/2017 Jepsen
2017/0293147 A1* 10/2017 Tremblay .......... G02B 27/0172
2019/0004319 A1 1/2019 Karafin et al.

OTHER PUBLICATIONS

Lanman, D.; Near-Eye Light Field Displays; NVIDIA Research.

* cited by examiner

Primary Examiner — Christopher Braniff
(74) Attorney, Agent, or Firm — Lorenz & Kopf, LLP

(57) ABSTRACT

A virtual window display includes: a plurality of collimated projector modules having contiguous exit pupils. Each collimated projector module includes: a display device configured to display a spatially modulated image along a flat or curved geometric image surface, and one or more optical lenses sharing a common curvature symmetry axis and configured to optically collimate light from the display device in the collimated projector module. The curvature symmetry axes of the plurality of collimated projector modules point in a plurality of angular directions and are substantially convergent along at least one axis at a finite distance from the plurality of collimated projectors. The total display FOV of the virtual window display is larger than the module FOV of each of the plurality of collimated projector modules.

20 Claims, 4 Drawing Sheets

VIRTUAL WINDOW DISPLAY

TECHNICAL FIELD

The technology described in this patent document relates generally to display systems and more particularly to virtual display systems.

BACKGROUND

See-thru display systems, such as head-up displays (HUDs), are used in vehicles to allow an operator of the vehicle to view the external environment, for example, for navigation and obstacle avoidance. There are times when see-thru displays are not advantageous, but a view of the external environment is still desired.

Accordingly, it is desirable to provide systems for providing a window-like view of an external environment. Furthermore, other desirable features and characteristics of the present invention will become apparent from the subsequent detailed description of the invention and the appended claims, taken in conjunction with the accompanying drawings and the background of the invention.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A virtual window display is provided. In one embodiment, the virtual window display has a total display field of view (FOV) and includes: a plurality of collimated projector modules having contiguous exit pupils, wherein each collimated projector module has a module FOV. Each collimated projector module includes: a display device configured to display a spatially modulated image along a flat or curved geometric image surface, and one or more optical lenses sharing a common curvature symmetry axis and configured to optically collimate light from the display device in the collimated projector module. The curvature symmetry axes of the plurality of collimated projector modules point in a plurality of angular directions and are substantially convergent along at least one axis at a finite distance from the plurality of collimated projectors. The total display FOV is larger than the module FOV of each of the plurality of collimated projector modules.

In another embodiment, a vehicle is provided. The vehicle includes a viewing area for viewing an environment external to the vehicle and a vehicle-mounted virtual window display having a total display field of view (FOV). The virtual window display includes a plurality of collimated projector modules having contiguous exit pupils wherein each collimated projector module has a module FOV and includes a display device configured to display a spatially modulated image along a flat or curved geometric image surface, and one or more optical lenses sharing a common curvature symmetry axis and configured to optically collimate light from the display device in the collimated projector module. The curvature symmetry axes of the plurality of collimated projector modules point in a plurality of angular directions and are substantially convergent along at least one axis at a finite distance from the plurality of collimated projectors. The exit pupil of at least one of the collimated projector modules is fully surrounded by exit pupils of other collimated projector modules. The total display field of view (FOV) is larger than the module FOV of each of the plurality of collimated projector modules.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Aspects of the present disclosure are best understood from the following detailed description when read with the accompanying figures, wherein like numerals denote like elements, and wherein.

DETAILED DESCRIPTION

The subject matter described herein discloses apparatus, systems, techniques and articles for a virtual window display. The following detailed description is merely exemplary in nature and is not intended to limit the invention or the application and uses of the invention. As used herein, the word "exemplary" means "serving as an example, instance, or illustration." Thus, any embodiment described herein as "exemplary" or "example" is not necessarily to be construed as preferred or advantageous over other embodiments. All embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary, or the following detailed description.

Figure 1A:
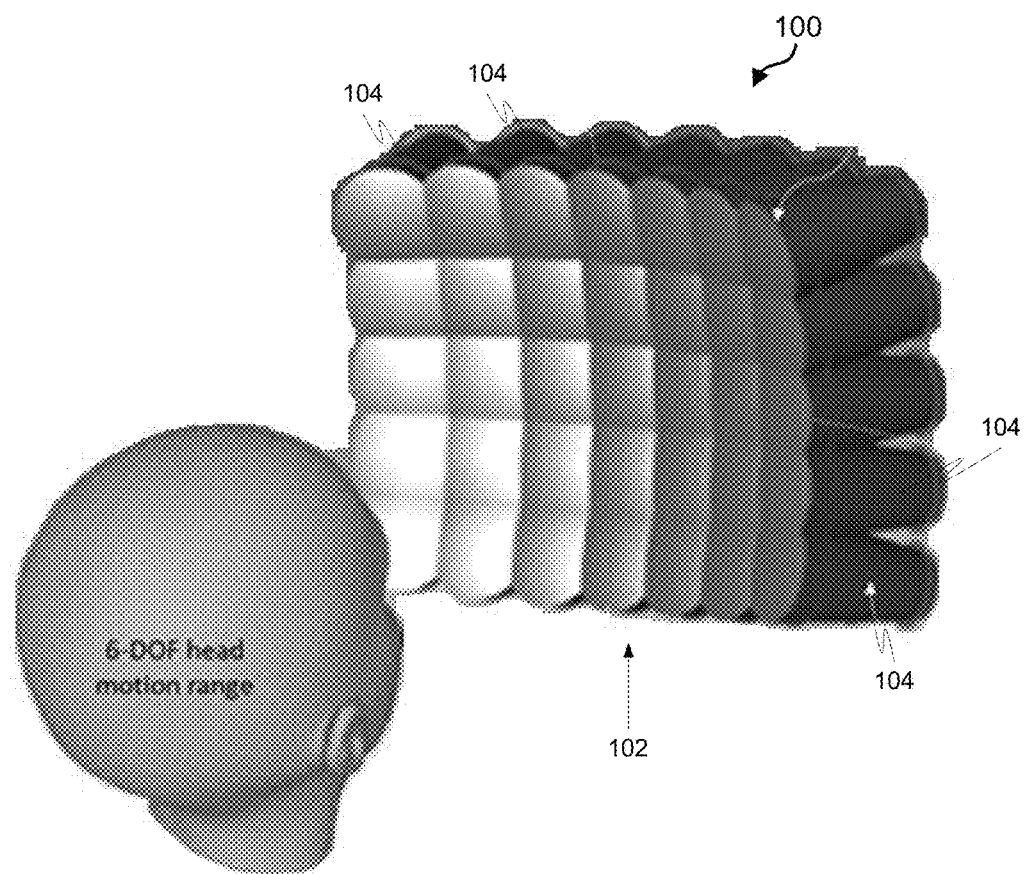
FIGS. 1A and 1C are diagrams depicting perspective views of example virtual window display systems, in accordance with some embodiments.
Figure 1B:
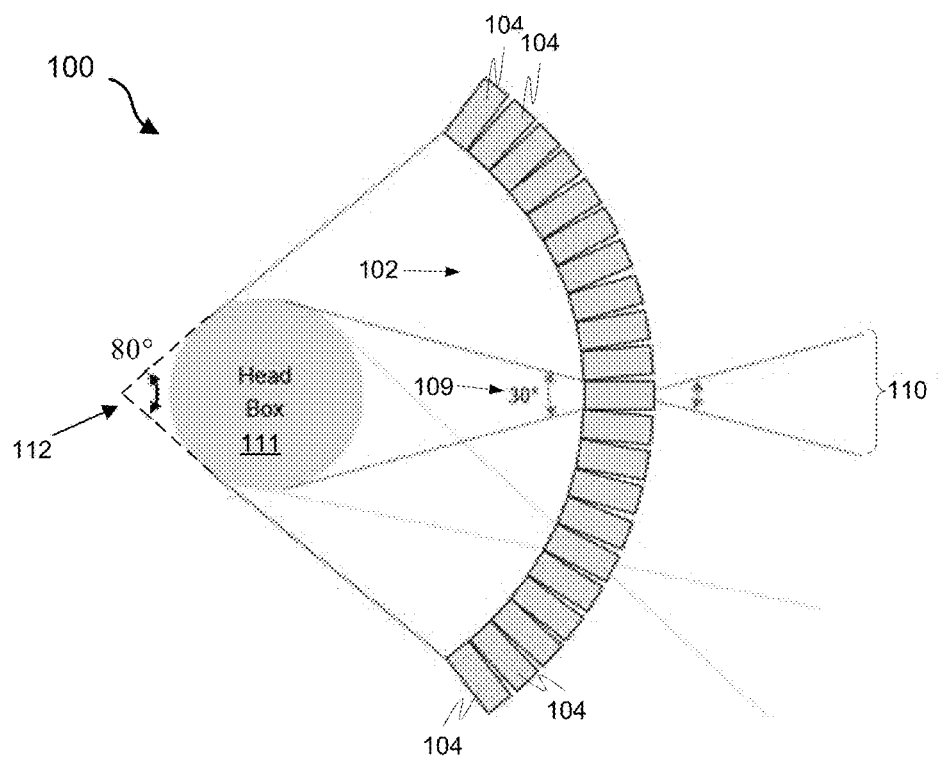
FIG. 1B is a diagram illustrating a top down view of an example virtual window display system, in accordance with some embodiments.

FIG. 1A is a diagram depicting a perspective view of an example virtual window display system 100. FIG. 1B is a diagram illustrating a top down view of the example virtual window display system 100. The example virtual window system 100 is configured to provide a realistic outside view from within a windowless enclosure without the use of a head-worn display. The example virtual window display system 100 includes a platform-mounted "virtual window" display 102 for use in, for example, a windowless vehicle or other confined space. The example virtual window display 102 provides a window-like appearance by making displayed imagery appear to be behind the display panel, with parallax behavior consistent with a distant scene.

The example virtual window display 102 is configured to produce a virtual image such as a collimated image having the distance accommodation and parallax behavior of a head up display (HUD), but with a wide field of view (FOV) and large head motion box, if needed. The example virtual window display 102 is scalable, up to and including a fully immersive wraparound display geometry, which can allow a viewer to visualize an environment and assess, for example, threats from both ground and air.

The example virtual window display 102 includes an array of collimated projector modules 104 with contiguous exit pupils. In the example shown, the virtual window display 102 includes a curved, contiguous array of collimated projector modules 104, but in other examples the virtual window display 102 may include a flat, contiguous array of collimated projector modules 104 or may have flat subsections. The curved, contiguous array of collimated projector modules 104 includes a plurality of rows of collimated projector modules and a plurality of columns of collimated projector modules. Both the number of rows and the number of columns in the virtual window array 102 are configurable to provide a desired FOV. In this example, the exit pupil of each collimated projector module 104, except for the exit pupils of the projector modules on the top and bottom rows and left and right end columns of the array of collimated projector modules, is fully surrounded by exit pupils of other collimated projector modules. This arrangement of fully surrounded exit pupils enables a large FOV. In other embodiments consistent with a smaller FOV in at least one axis, a virtual window array may not include fully surrounded projector module exit pupils. The row and column arrangement of FIG. 1 is not intended to be limiting, and numerous other configurations are possible which allow for substantially contiguous module exit pupils. In one example, an array could comprise hexagonal exit pupils.

Figure 1C:
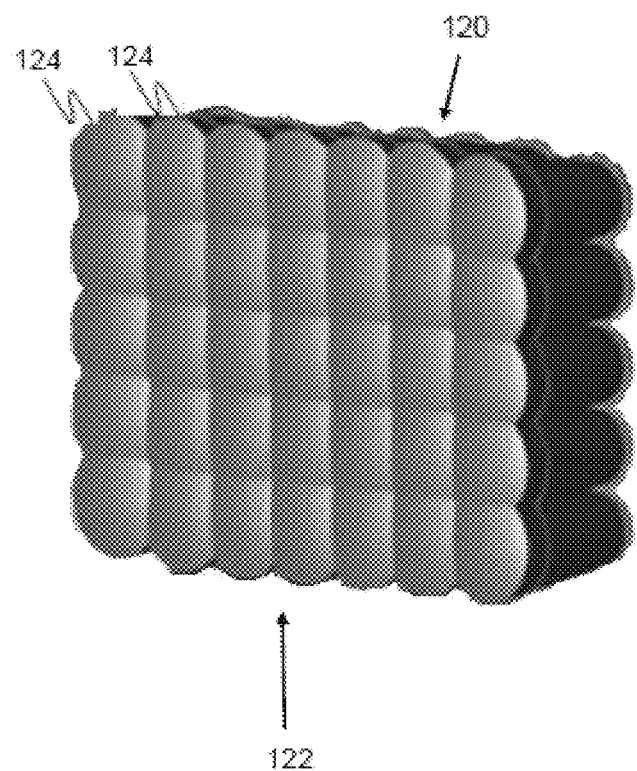

A curved array shape, e.g., in a spherical wrap-around potentially immersive arrangement, can provide for a larger total FOV versus a FOV for a flat shape. As illustrated in FIG. 1B, the total FOV for the viewer is primarily a function of the angle subtended by the array of collimated projector modules 104 while the Head Box 111 or head motion box 111 from which all of the projectors can be seen is the area where the individual projector FOV all overlap. With the configuration of FIG. 1B, Head Box 111 is seen as circular in shape, and the total FOV can be represented by angle 112, which is the FOV that is visible throughout Head Box 111. In the example of FIG. 1B, the total FOV 112 is 80° wherein the FOV 109 of each projector module 104 is considerably smaller (30° for each projector module 104 in this example). The actual FOV viewable from each vantage point will vary somewhat. For example, points at the front of head box 111 will provide a FOV that is larger than the FOV 112 visible from the rear (further from the projector modules) of head box 111. The actual range of head motion is much larger if one considers regions with partial vignetting of the FOV. Each collimated projector module 104 has a curvature symmetry axis that points in a different angular direction, but the plurality of curvature symmetry axes substantially converge at a finite distance from the plurality of collimated projectors, e.g., in the center of the head box 111. It can be seen from FIG. 1A that convergence can occur around multiple axes, e.g. horizontally and vertically, but the benefit of convergence can also be provided around a single axis such as a cylindrical symmetry, for example, if the desired FOV in one direction is less than the desired FOV in another direction. It is also unnecessary for the plurality of symmetry axes to converge to a single point, as the benefits are similar when the substantial convergence is to a head box region. FIG. 1C shows an example virtual window display system 120, in which the plurality of curvature symmetry axes of projectors 124 are parallel and do not converge. While not providing the expanded total FOV associated with convergence, such a system can be valuable when the FOV needs are more limited, or when only a limited number of projector modules are used.

Each collimated projector module 104 or 124 is preferably configured to support use of autostereoscopic techniques to allow the image to be displayed as a stereoscopic image. The autostereoscopic technique may include a distributed rendering technique or others.

The multi-aperture approach of providing the array of projector modules 104 is inherently autostereoscopic-capable when the size or width of the individual exit pupils is kept at or below the inter-pupillary distance (IPD) of the viewer. Consequently, in the example virtual window display 102, the size of the exit pupil of each collimated projector module 104 is preferably at or below the IPD of an expected viewer. Generated imagery can be rendered assuming either biocular or binocular operating modes, or a combination thereof. In each case, a fixed reference position (e.g., OpenGL camera position) or set of reference positions can be used. Similarly, one or more cameras or similar imaging sensors can be used, and the image data extracted and distributed appropriately for the one or more reference positions.

The exit pupil size for the example projector modules 104 is preferably between 2 mm and 45 mm. A goal, especially for virtual window use, is to provide high resolution, distant imagery. Smaller apertures will tend to degrade visual acuity due to diffraction unless the light passing through adjacent apertures has a common phase-matched wavefront. Larger apertures will limit the autostereo functionality. Tradeoffs throughout the range include the number of modules, system depth or thickness, weight, image source requirements, seam to aperture ratio, etc. The combination of macroscopic apertures and high image resolution readily distinguishes this from conventional light field and integral imaging displays incorporating microlens arrays, where high acuity is commonly associated with smaller constituent lenslet apertures within the microlens array.

The image displayed by the projector modules 104 may be from digitally generated imagery or processed image data, e.g., from a camera or image sensor. In the case of processed image data, multiple cameras may be used, such as where each collimated projector module may be paired with a corresponding camera. When paired with a corresponding camera, the orientations, FOVs, and distortion characteristics may be matched or adjusted to be equivalent, to simplify data distribution and processing. The corresponding cameras may be substantially co-located with each other to present a biocular view, or distributed similarly to the distribution of the projector array to provide an autostereoscopic binocular view. For example, each camera could be mounted behind the physical image source of its corresponding projector and facing in the opposite direction consistent with FOV 110.

In the case of digitally generated imagery, the imagery may be rendered for a single reference position such as the center of head box 111, or distributed rendering may be used, such as rendering for a distributed set of reference positions. In an example of distributed rendering, each OpenGL camera position could correspond to an individual projector location and with a direction consistent with a corresponding FOV 110.

Because the virtual display window 102 uses a plurality of smaller projector modules 104, instead of one or more larger projector modules, the optics are broken into smaller sections. By breaking the optics into smaller sections, simpler optics can be used and the system can be reduced in depth.

Figure 2A:
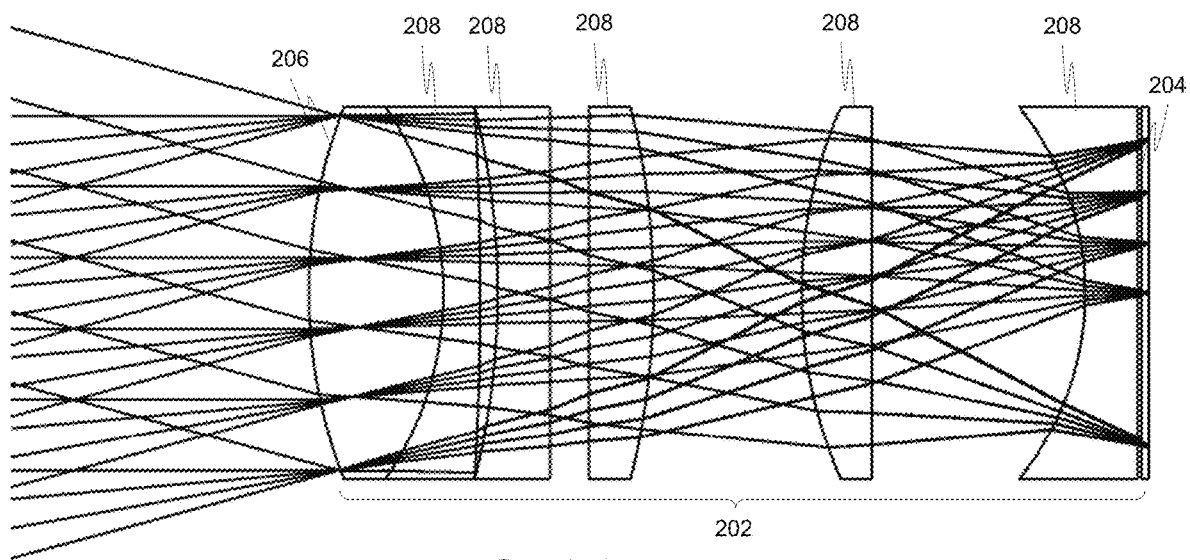
FIGS. 2A and 2B are diagrams illustrating prospective views of example projector modules, in accordance with some embodiments.
Figure 2B:
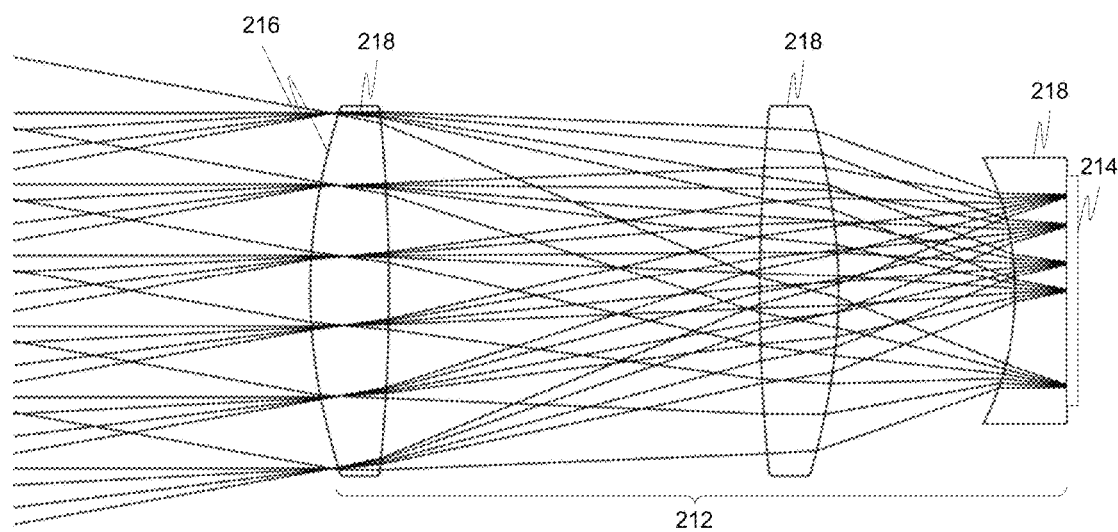

FIGS. 2A and 2B are diagrams illustrating prospective views of example projector modules 202, 212. The example projector module 202 includes a display device 204 configured to display a spatially modulated image along its geometric image surface. In this case, display device 204 is depicted as having a flat geometric image surface, but curved geometric image surfaces are envisioned as well. One or more optical lenses 208 share a common curvature symmetry axis and are configured to optically collimate light from the display device 204 in the collimated projector module 202, resulting in angularly modulated light rays projected from output lens surface 206. Similarly, the example projector module 212 includes a display device 214 configured to display a spatially modulated image along a flat or curved geometric image surface, and one or more optical lenses 218 sharing a common curvature symmetry axis and configured to optically collimate light from the display device 214 in the collimated projector module 212 and project that light through surface 216.

The display devices 204, 214 in these examples are of sufficient pixel density to deliver high angular resolution imagery to the viewer, preferably greater than 30 pixels per degree (ppd) and more preferably 60 ppd or more. In some embodiments, especially when the projector modules are small, these display devices may be described as micro display devices. The display devices 204, 214 can be any type of emissive or spatial light modulating device, such as AMOLED (active-matrix organic light-emitting diode), AMLCD (active-matrix liquid-crystal display), LCOS (liquid crystal on silicon), μLED (micro light emitting diode), projection-based devices, or others. Light from display device 204 or 214 can be either coherent or incoherent, but is preferably incoherent to avoid coherence artifacts such as laser speckle. In some embodiments, two or more adjacent projector modules may utilize separate regions of a common, shared display device.

Seams or interfaces between the projector modules 202, 212 in a virtual window display (e.g., virtual window display 102) can be minimized by suitable optical designs. The example optical design depicted in FIG. 2A illustrates an optical design that uses only spherical lens surfaces. The example optical design depicted in FIG. 2B illustrates an optical design that uses more complex surface topologies. These examples are not intended to be limiting, and other elements such as holographic or metamaterial lenses may also be used. In some cases such lens-like elements may appear flat but still have an effective optical curvature symmetry axis. In each of these example designs, seams are minimized by positioning the limiting aperture, or exit pupil, at the front surface 206, 216 of the front lens. In these examples, when lenses are trimmed, the rays from neighboring projectors can be closely spaced with minimal gaps. The lenses can be trimmed as needed to fill or tessellate the intended surface. The optical design may include consideration of the size of the other lenses and the physical display device to allow them to fit in the allocated volume. Other optical design considerations may include depth, F-number, resolution, FOV, aberration control, cost, weight, etc. In cases where larger collimation angles may be partially vignetted resulting in reduced effective exit pupil size for those angles, such extra FOV can be desirable despite increased visibility of associated seams. Preferably, substantially contiguous exit pupils should be provided over sufficient module FOV 109 to result in head box 111 having a diameter at least as large as the IPD of an anticipated viewer.

When used in a windowless environment, the typically external environment that is visible within the virtual window display 102 is visible within the vehicle or other location exclusively via the virtual window display 102 or in conjunction with other displays such as near-to-eye (NTE) displays. A virtual window display may also be used as a conformal-capable see-through HUD that can deliver both wide field of view and a large head motion box with a manageable size, weight and cost if appropriate tradeoffs are made.

Figures 3A, 3B:
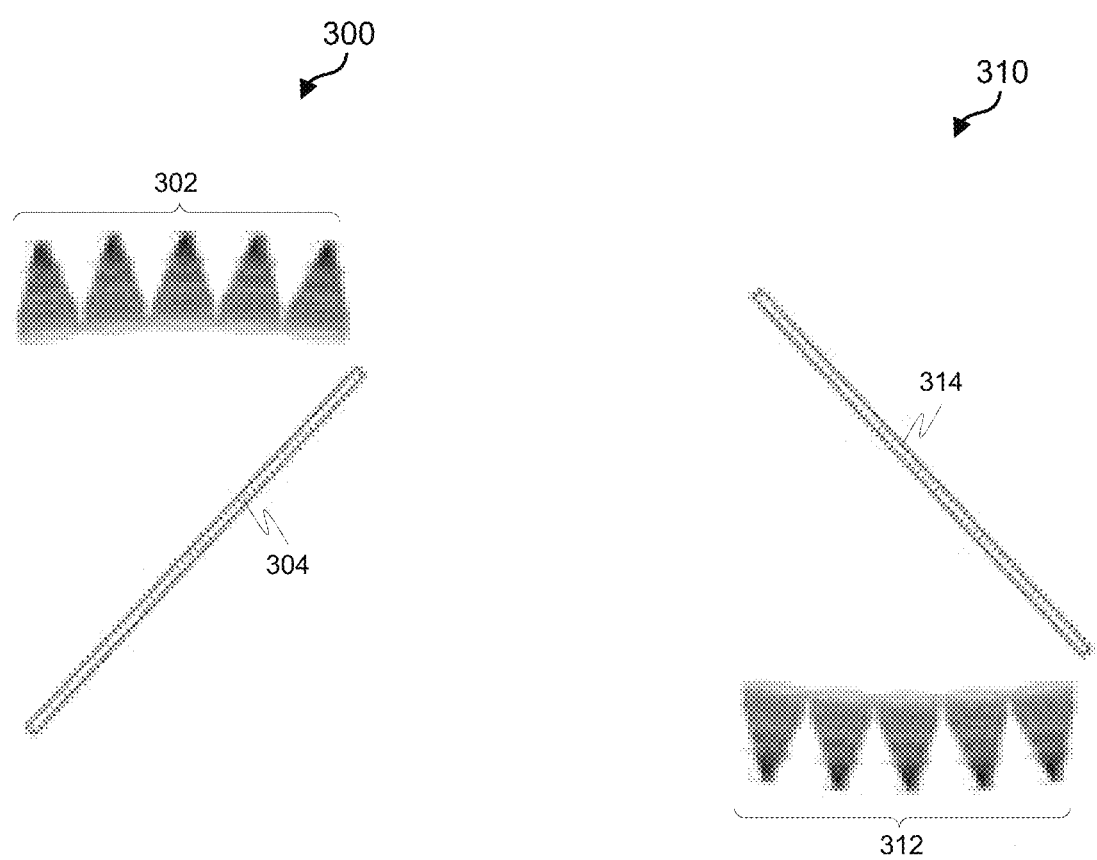
FIGS. 3A and 3B are diagrams depicting example conformal-capable see-through HUDs that includes a plurality of collimated projector modules that are configured to project an image onto a display combiner, in accordance with some embodiments.

FIG. 3A is a diagram depicting an example conformal-capable see-through HUD 300 that includes a plurality of collimated projector modules 302 that are configured to project an image onto a display combiner 304. The display combiner 304 is configured to overlay an image of a scene with a virtual image originating from the plurality of collimated projector modules 302. The combiner 304 may further include an attenuator (e.g., electrochromic device) that is controllable to allow the HUD 300 to switch between functioning in an augmented reality or virtual reality mode. The combiner 304 may further include a mirror that is deployable or otherwise controllable to allow the HUD 300 to switch between functioning in an augmented reality (AR) mode for conformal HUD operation or virtual reality (VR) mode for conformal virtual window operation. The HUD 300 may further include a repositioning mechanism controllable to cause the plurality of collimated projector modules 302 to be moved into the line of sight as a deployable virtual window shield (e.g., to guard against potential laser attack or sun glare).

FIG. 3B is a diagram depicting another example conformal-capable see-through HUD 310 that includes a plurality of collimated projector modules 312 that are configured to project an image onto a display combiner 314. The display combiner 314 is configured to overlay an image of a scene with a virtual image originating from the plurality of collimated projector modules 312. The combiner 314 may further include an attenuator (e.g., electrochromic device) that is controllable to allow the HUD 310 to switch between functioning in an augmented reality or virtual reality mode. The combiner 314 may further include a mirror that is controllable to allow the HUD 310 to switch between functioning in an augmented reality (AR) mode for conformal HUD operation or virtual reality (VR) mode for conformal virtual window operation. The HUD 310 may further include a repositioning mechanism controllable to cause the plurality of collimated projector modules 312 to be moved into the line of sight as a deployable virtual window shield (e.g., to guard against potential laser attack or sun glare).

The subject matter described herein discloses apparatus, systems, methods, and techniques that can be used for "indirect driving" of occupied, moveable vehicles which have little or no direct visibility of the environment in which the vehicle is being operated. Moveable vehicle types may include ground vehicles, aircraft, underwater vehicles, spacecraft or the like. The reasons for removing, covering, attenuating or otherwise eliminating the windows and outside view may include for armor protection, laser protection, reduced detectability, aerodynamic benefits, structural benefits, etc. These applications can benefit from effective conformality of the displayed imagery with the outside environment, as if it were a window.

The subject matter described herein discloses apparatus, systems, methods, and techniques that can be used for remote operation while in a stationary vehicle or platform (e.g., a room in a building) or unmanned, moveable vehicles or platforms, remote backup (e.g. remote co-pilots), training simulators or any other use where a realistic exterior view adds value. In part because of inherent multi-view autostereoscopic capability, the subject matter described herein discloses apparatus, systems, methods, and techniques that can be used for analyst workstations, collaborative systems, medical imaging and more. The subject matter described herein also discloses apparatus, systems, methods, and techniques that can be used for a non-head-worn virtual reality display used in commercial, advertising and consumer applications.

In one embodiment, a virtual window display is provided. The virtual window display has a total display field of view (FOV) and comprises: a plurality of collimated projector modules having contiguous exit pupils, wherein each collimated projector module has a module FOV. Each collimated projector module comprises: a display device configured to display a spatially modulated image along a flat or curved geometric image surface; and one or more optical lenses sharing a common curvature symmetry axis and configured to optically collimate light from the display device in the collimated projector module. The curvature symmetry axes of the plurality of collimated projector modules point in a plurality of angular directions and are substantially convergent along at least one axis at a finite distance from the plurality of collimated projectors. The total display FOV is larger than the module FOV of each of the plurality of collimated projector modules.

These aspects and other embodiments may include one or more of the following features. The plurality of collimated projector modules may comprise a curved, contiguous array of collimated projector modules. The curved, contiguous array of collimated projector modules may comprise a plurality of rows of collimated projector modules and a plurality of columns of collimated projector module. The exit pupil of at least one of the collimated projector modules may be fully surrounded by exit pupils of other collimated projector modules. The display device configured to display a spatially modulated image may comprise a micro display device. The display device may comprise an emissive or spatial light modulating device. The micro display device may comprise an emissive or spatial light modulating device. Each collimated projector module may be configured to use an autostereoscopic technique to cause the image to be displayed as a stereoscopic image. The autostereoscopic technique may comprise a distributed rendering technique. The size of the exit pupil of each collimated projector module may be at or below the inter-pupillary distance (IPD) of an expected viewer. Each collimated projector module may be paired with a corresponding camera. The virtual window display may further comprise a combiner configured to overlay a first image of a scene with the virtual image originating from the plurality of collimated projector modules. The virtual image may be viewable without the use of a head-worn display.

In another embodiment, a vehicle is provided. The vehicle comprises a viewing area for viewing an environment external to the vehicle and a vehicle-mounted virtual window display having a total display field of view (FOV). The virtual window display comprises a plurality of collimated projector modules having contiguous exit pupils wherein each collimated projector module has a module FOV and comprises a display device configured to display a spatially modulated image along a flat or curved geometric image surface; and one or more optical lenses sharing a common curvature symmetry axis and configured to optically collimate light from the display device in the collimated projector module. The curvature symmetry axes of the plurality of collimated projector modules point in a plurality of angular directions and are substantially convergent along at least one axis at a finite distance from the plurality of collimated projectors. The exit pupil of at least one of the collimated projector modules is fully surrounded by exit pupils of other collimated projector modules. The total display field of view (FOV) is larger than the module FOV of each of the plurality of collimated projector modules.

These aspects and other embodiments may include one or more of the following features. The plurality of collimated projector modules may comprise a curved, contiguous array of collimated projector modules. The curved, contiguous array of collimated projector modules may comprise a plurality of rows of collimated projector modules and a plurality of columns of collimated projector module. The display device configured to display a spatially modulated image may comprise a micro display device. Each collimated projector module may be configured to use an autostereoscopic technique to cause the image to be displayed as a stereoscopic image. The autostereoscopic technique may comprise a distributed rendering technique. The size of the exit pupil of each collimated projector module may be at or below the inter-pupillary distance (IPD) of an expected viewer. Each collimated projector module may be paired with a corresponding camera. The vehicle may comprise a movable vehicle such as a ground vehicle, aircraft, underwater vehicle, or spacecraft. The vehicle may comprise a stationary vehicle or platform such as a room in a building. The external environment that is visible within the total display FOV of the virtual window display may be visible within the vehicle exclusively via the virtual window display. The virtual window display may further comprise a combiner configured to overlay a first image of a scene with the virtual image originating from the plurality of collimated projector modules. The virtual window display may comprise a HUD. The combiner may further comprise an attenuator (e.g., electrochromic device) that is controllable to allow the virtual window display to switch between functioning in an augmented reality or virtual reality mode. The combiner may further comprise a mirror that is controllable to allow the virtual window display to switch between functioning in an augmented reality or virtual reality mode. The vehicle may further comprise a repositioning mechanism controllable to cause the plurality of collimated projector modules to be moved into the line of sight as a deployable virtual window shield.

In another embodiment, a display system is provided. The display system comprises a curved, contiguous array of collimated projector modules with contiguous exit pupils and comprising a plurality of rows of collimated projector modules and a plurality of columns of collimated projector module. Each collimated projector module comprises: a display device configured to display an image generated by an image projector configured to generate a virtual image for display on the curved array of collimated projector modules and one or more optical lenses configured to optically collimate light from the display device in the collimated projector module. Each collimated projector module employs an autostereoscopic technique comprising a distributed rendering technique configured to cause the virtual image to be displayed as a stereoscopic image. The size of the exit pupil of each collimated projector module is at or below the inter-pupillary distance (IPD) of an expected viewer. Each collimated projector module is paired with a corresponding camera. The display device has a total display field of view (FOV) that is decoupled from the FOV of the image projector and based on the number of columns and rows of collimated projector modules.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention if such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A virtual window display having a total display field of view (FOV), comprising:
   a plurality of collimated projector modules having contiguous and non-overlapping exit pupils, each collimated projector module having a module FOV and comprising:
      a display device configured to display a spatially modulated image along a flat or curved geometric image surface; and
      one or more optical lenses sharing a common curvature symmetry axis and configured to optically collimate light from the display device in the collimated projector module;
   wherein the curvature symmetry axes of the plurality of collimated projector modules point in a plurality of angular directions and are substantially convergent along at least one axis at a finite distance from the plurality of collimated projectors;
   wherein the virtual display window makes displayed imagery appear to be behind the display device, with parallax behavior consistent with a distant scene; and
   wherein the total display field of view (FOV) is larger than the module FOV of each of the plurality of collimated projector modules.

2. The virtual window display of claim 1, wherein the plurality of collimated projector modules comprises a curved, contiguous array of collimated projector modules.

3. The virtual window display of claim 1, wherein the virtual display window provides a collimated image over a head motion box comparable to or larger than the interpupillary distance (IPD) of a viewer.

4. The virtual window display of claim 1, wherein the display device comprises an emissive or spatial light modulating device.

5. The virtual window display of claim 1, wherein each collimated projector module is configured to use an autostereoscopic technique to cause the image to be displayed as a stereoscopic image.

6. The virtual window display of claim 1, wherein:
   the size of the exit pupil of each collimated projector module is at or below the inter-pupillary distance (IPD) of an expected viewer; and
   the exit pupil or limiting aperture of each collimated projector module is located substantially at the front surface of the front lens of the one or more optical lenses of the collimated projector module.

7. The virtual window display of claim 1, wherein each collimated projector module is paired with a corresponding camera and configured to display the image sensed by the corresponding camera.

8. The virtual window display of claim 1, further comprising a combiner configured to overlay a first image of a scene with the virtual image originating from the plurality of collimated projector modules.

9. A vehicle comprising a viewing area for viewing an environment external to the vehicle and a vehicle-mounted virtual window display having a total display field of view (FOV), the virtual window display comprising:
- a plurality of collimated projector modules having contiguous and non-overlapping exit pupils, each collimated projector module having a module FOV and comprising:
  - a display device configured to display a spatially modulated image along a flat or curved geometric image surface; and
  - one or more optical lenses sharing a common curvature symmetry axis and configured to optically collimate light from the display device in the collimated projector module;
- wherein the virtual display window makes displayed imagery appear to be behind the display device, with parallax behavior consistent with a distant scene;
- wherein the curvature symmetry axes of the plurality of collimated projector modules point in a plurality of angular directions and are substantially convergent along at least one axis at a finite distance from the plurality of collimated projectors;
- wherein the exit pupil of at least one of the collimated projector modules is fully surrounded by exit pupils of other collimated projector modules; and
- wherein the total display field of view (FOV) is larger than the module FOV of each of the plurality of collimated projector modules.

10. The vehicle of claim 9, wherein the plurality of collimated projector modules comprises a curved, contiguous array of collimated projector modules.

11. The vehicle of claim 9, wherein each collimated projector module is configured to use an autostereoscopic technique to cause the image to be displayed as a stereoscopic image.

12. The vehicle of claim 9, wherein:
- the size of the exit pupil of each collimated projector module is at or below the inter-pupillary distance (IPD) of an expected viewer; and
- the exit pupil or limiting aperture of each collimated projector module is located substantially at the front surface of the front lens of the one or more optical lenses of the collimated projector module.

13. The vehicle of claim 9, wherein each collimated projector module is paired with a corresponding camera and configured to display the image sensed by the corresponding camera.

14. The vehicle of claim 9, wherein the vehicle comprises a moveable vehicle.

15. The vehicle of claim 9, wherein the vehicle comprises a stationary vehicle or platform.

16. The vehicle of claim 9, wherein the external environment is visible within the total display FOV of the virtual window display is visible within the vehicle exclusively via the virtual window display.

17. The vehicle of claim 9, wherein the virtual window display further comprises a combiner configured to overlay a first image of a scene with the virtual image originating from the plurality of collimated projector modules.

18. The vehicle of claim 17, wherein the combiner further comprises an attenuator or mirror that is controllable to allow the virtual window display to switch between functioning in an augmented reality or virtual reality mode.

19. The vehicle of claim 17, further comprising a repositioning mechanism controllable to cause the plurality of collimated projector modules to be moved into the line of sight as a deployable virtual window shield.

20. A display system comprising:
- a curved, contiguous array of collimated projector modules with contiguous and non-overlapping exit pupils and comprising a plurality of rows of collimated projector modules and a plurality of columns of collimated projector modules, each collimated projector module comprising:
  - a display device configured to display an image generated by an image projector configured to generate a virtual image for display on the curved array of collimated projector modules;
  - one or more optical lenses configured to optically collimate light from the display device in the collimated projector module; and
  - wherein each collimated projector module employs an autostereoscopic technique comprising a distributed rendering technique configured to cause the virtual image to be displayed as a stereoscopic image;
- wherein the size of the exit pupil of each collimated projector module is at or below the inter-pupillary distance (IPD) of an expected viewer;
- wherein the exit pupil or limiting aperture of each collimated projector module is located substantially at the front surface of the front lens of the one or more optical lenses of the collimated projector module; and
- wherein each collimated projector module is paired with a corresponding camera and configured to display the image sensed by the corresponding camera;
- wherein the display system provides a collimated image over a head motion box comparable to or larger than the interpupillary distance (IPD) of a viewer;
- wherein the display system makes displayed imagery appear to be behind the display device, with parallax behavior consistent with a distant scene; and
- wherein the display device has a total display field of view (FOV) that is decoupled from the FOV of the image projector and based on the number of columns and rows of collimated projector modules.

* * * * *

UNITED STATES PATENT AND TRADEMARK OFFICE
CERTIFICATE OF CORRECTION

PATENT NO. : 10,785,473 B2  
APPLICATION NO. : 16/244360  
DATED : September 22, 2020  
INVENTOR(S) : Brent D. Larson, Ken Leiphon and Kalluri R. Sarma Page 1 of 1

It is certified that error appears in the above-identified patent and that said Letters Patent is hereby corrected as shown below:

In the Claims

Column 12, Lines 1-2 (Claim 16), after "environment" insert --that--

Signed and Sealed this  
Eighth Day of December, 2020

Andrei Iancu  
*Director of the United States Patent and Trademark Office*